United States Patent
Park

(10) Patent No.: US 12,209,973 B2
(45) Date of Patent: Jan. 28, 2025

(54) SYSTEM FOR ANALYZING FOREIGN PARTICULATE MATTER IN CATHODE MATERIAL POWDER

(71) Applicant: SCIGENTEC CO., LTD., Seoul (KR)

(72) Inventor: Yong Jae Park, Seoul (KR)

(73) Assignee: SCIGENTEC CO., LTD., Seoul (KR)

( * ) Notice: Subject to any disclaimer, the term of this patent is extended or adjusted under 35 U.S.C. 154(b) by 0 days.

(21) Appl. No.: 18/672,530

(22) Filed: May 23, 2024

(65) Prior Publication Data

US 2024/0393260 A1    Nov. 28, 2024

(30) Foreign Application Priority Data

May 23, 2023   (KR) .................. 10-2023-0066597

(51) Int. Cl.
| | |
|---|---|
| G01N 21/94 | (2006.01) |
| B07C 5/342 | (2006.01) |
| B08B 1/16 | (2024.01) |
| B08B 1/20 | (2024.01) |
| B08B 5/04 | (2006.01) |
| G06T 7/00 | (2017.01) |
| H01M 4/02 | (2006.01) |

(52) U.S. Cl.
CPC .......... *G01N 21/94* (2013.01); *B07C 5/3425* (2013.01); *B08B 1/165* (2024.01); *B08B 1/20* (2024.01); *B08B 5/043* (2013.01); *H01M 4/02* (2013.01); *G06T 7/0004* (2013.01); *H01M 2004/028* (2013.01)

(58) Field of Classification Search
CPC ...... G01N 21/94; B07C 5/3425; B08B 1/165; B08B 1/20; B08B 5/043; H01M 4/02; H01M 2004/028; G06T 7/0004
See application file for complete search history.

(56) References Cited

U.S. PATENT DOCUMENTS

2018/0071883 A1* 3/2018 Murachi ................ B08B 3/022

FOREIGN PATENT DOCUMENTS

KR    10-2019-0012516 A    2/2019

* cited by examiner

*Primary Examiner* — Jacob S. Scott
*Assistant Examiner* — Miraj T. Patel
(74) *Attorney, Agent, or Firm* — NSIP Law

(57) ABSTRACT

Disclosed is a system for analyzing foreign particulate matter in a cathode material powder. The system includes: a transfer unit including a rotating plate having an upper surface having an edge on which a cathode material powder containing foreign particulate matter is placed and a rotary motor rotating the rotating plate and transferring the cathode material powder along the circular arc direction as the rotating plate rotates; a supply unit supplying the cathode material powder to the upper surface of the rotating plate; a roller unit including a main roller pressing the cathode material powder supplied from the supply unit; an imaging unit imaging the cathode material powder spread in the form of a flat film and transferred along the circular arc direction; and an analysis unit analyzing the image captured by the imaging unit to identify the foreign particulate matter.

13 Claims, 6 Drawing Sheets

SYSTEM FOR ANALYZING FOREIGN PARTICULATE MATTER IN CATHODE MATERIAL POWDER

CROSS REFERENCE TO RELATED APPLICATIONS

This application claims the benefit under 35 U.S.C. § 119 (a) of Korean Patent Application No. 10-2023-0066597 filed on May 23, 2023 in the Korean Intellectual Property Office, the entire disclosures of which is incorporated herein by reference for all purposes.

BACKGROUND OF THE INVENTION

1. Field of the Invention

The present invention relates to a system for analyzing foreign particulate matter in a cathode material powder, and more specifically to a system for directly analyzing foreign particulate matter in a cathode material powder for a secondary battery.

2. Description of the Related Art

The four major elements of a secondary battery are generally a cathode material, an anode material, an electrolyte, and a separator. The cathode material, the anode material, and the separator are considered essential materials because they determine the overall performance of the secondary battery. A representative lithium secondary battery generally generates electricity through chemical reactions of lithium ions moving between cathode and anode materials. The cathode material is a lithium source and is a main material that releases and absorbs lithium from its crystal lattice during charging and discharging of the battery to store electrical energy in the battery and release electrical energy from the battery. Cathode materials are known to account for more than 40% of the total production cost of secondary batteries and are divided into various types by the composition of metal salts they employ. Cathode materials determine the overall capacity and output of secondary batteries. Since cathode materials very greatly affect the performance of secondary batteries, it is very important to control foreign matter in the cathode materials. Particularly, when a cathode material contains magnetic foreign matter, the magnetic foreign matter moves to the anode to form dendrites during charge and discharge. When the dendrites pass through the separator and reach the cathode, an internal short-circuit may occur, causing serious problems in the stability of the battery. These problems can be prevented by strictly controlling the content of magnetic foreign matter in the electrode slurry during production of the cathode material.

According to a conventional method for analyzing foreign matter in a cathode material, the cathode material is directly decomposed with an acid and the pretreated cathode material is analyzed by inductively coupled plasma optical emission spectroscopy (ICP-OES). However, the wavelength position of a transition metal as a main component of the cathode material may be close to that of magnetic foreign matter. In this case, interference occurs, making it difficult to analyze the trace magnetic foreign matter in the anode cathode material by ICP-OES. In an attempt to solve this problem, a method was developed in which a magnet is used to adsorb magnetic foreign matter in a cathode material and the pretreated foreign matter is analyzed with ICP-OES. According to this method, magnetic foreign matter in a cathode material is adsorbed to a magnet, water or NMP is added to remove the cathode material components, hydrochloric acid and ultrapure water are added to the magnet adsorbed by the magnetic foreign matter, the magnetic foreign matter is dissolved by heating, and the content of the magnetic foreign matter is measured. Since this indirect analysis method using a small amount of a collected sample has difficulty in rapidly analyzing the sample, it is not suitable for real-time production management for mass production. Further, since targets to be analyzed by the conventional method are limited to magnetic foreign matter, the conventional method cannot be used to analyze non-magnetic foreign matter.

Thus, there is an urgent need for a solution to the problems of conventional methods for analyzing foreign matter in cathode materials.

SUMMARY OF THE INVENTION

The present invention has been made in an effort to solve the problems of the prior art and one aspect of the present invention provides a system for analyzing foreign particulate matter in a cathode material powder in which the cathode material powder is pressed using a roller on a rotating plate and its image is captured during transfer.

According to an exemplary embodiment of the present invention, the system includes: a transfer unit including a rotating plate having an upper surface having an edge on which a cathode material powder containing foreign particulate matter is placed and a rotary motor rotating the rotating plate and transferring the cathode material powder along the circular arc direction as the rotating plate rotates; a supply unit supplying the cathode material powder to the upper surface of the rotating plate; a roller unit including a main roller pressing the cathode material powder supplied from the supply unit to spread the powder in the form of a flat film while a rotary shaft arranged parallel to the upper surface of the rotating plate rotates; an imaging unit imaging the cathode material powder spread in the form of a flat film and transferred along the circular arc direction; and an analysis unit analyzing the image captured by the imaging unit to identify the foreign particulate matter.

According to an exemplary embodiment of the present invention, the system may further include a guide groove which is depressed in the form of a ring along the edge of the upper surface of the rotating plate so as to face the main roller, in which the cathode material powder is filled, and through which the filled cathode material powder is spread in the form of a flat film.

According to an exemplary embodiment of the present invention, the supply unit may include a hopper storing the cathode material powder therein and a chute supplying the cathode material powder discharged from the hopper to the upper surface of the rotating plate.

According to an exemplary embodiment of the present invention, the supply unit may further include a supply vibrator vibrating at least one of the hopper and the chute. According to an exemplary embodiment of the present invention, the roller unit may further include a distancing mechanism adjusting the distance between the main roller and the upper surface of the rotating plate.

According to an exemplary embodiment of the present invention, the distancing mechanism may include: a pair of sliding bars arranged to face each other such that both ends of the rotary shaft of the main roller are inserted and guiding upward and downward movement of the rotary shaft; actuators arranged in the corresponding sliding bars and moving the ends of the rotary shaft up and down; a pressure sensor measuring a pressure applied to the main roller when the main roller is in close contact with the cathode material powder; and a distance controller operating the actuators based on the pressure information measured by the pressure sensor.

According to an exemplary embodiment of the present invention, the roller unit may further include a sub-roller arranged in parallel with the main roller and pressing the cathode material powder spread by the main roller while rotating to re-spread the cathode material powder.

According to an exemplary embodiment of the present invention, the roller unit may further include a roller vibrator vibrating the sub-roller in upward and downward directions.

According to an exemplary embodiment of the present invention, the system may further include a first suction unit sucking residual powder pressed by the main roller and attached to the outer surface of the main roller.

According to an exemplary embodiment of the present invention, the first suction unit may include: a first suction element having a first suction opening facing the upper side of the main roller; and a first scraper disposed around the first suction opening and scraping the residual powder while being in contact with the outer surface of the rotating main roller.

According to an exemplary embodiment of the present invention, the system may further include a second suction unit sucking the cathode material powder imaged by the imaging unit.

According to an exemplary embodiment of the present invention, the second suction unit may include: a second suction element having a second suction opening facing the upper surface of the rotating plate at a point where the cathode material powder is imaged by the imaging unit and transferred; and a second scraper disposed around the second suction opening and scraping the cathode material powder while being in contact with the outer surface of the rotating plate.

According to an exemplary embodiment of the present invention, when the analysis unit determines that the cathode material powder contains foreign particulate matter, the system may further include a foreign matter suction unit sucking the cathode material powder containing the foreign particulate matter.

The features and advantages of the present invention will become apparent from the following description with reference to the accompanying drawings.

Prior to the detailed description of the invention, it should be understood that the terms and words used in the specification and the claims are not to be construed as having common and dictionary meanings but are construed as having meanings and concepts corresponding to the technical spirit of the present invention in view of the principle that the inventor can define properly the concept of the terms and words in order to describe his/her invention with the best method.

The system of the present invention is suitable for the behavioral characteristics of a cathode material powder and provides analysis results based on real-time image information on fine foreign matter having a manageable particle size of 5 to 10 microns, allowing a manufacturer to quickly determine the suitability of cathode material products.

In addition, the system of the present invention can be used to rapidly analyze a cathode material powder, enabling real-time production management for mass production. Targets to be analyzed by the system of the present invention are not limited to magnetic foreign matter and the system of the present invention can also effectively analyze non-magnetic foreign matter.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
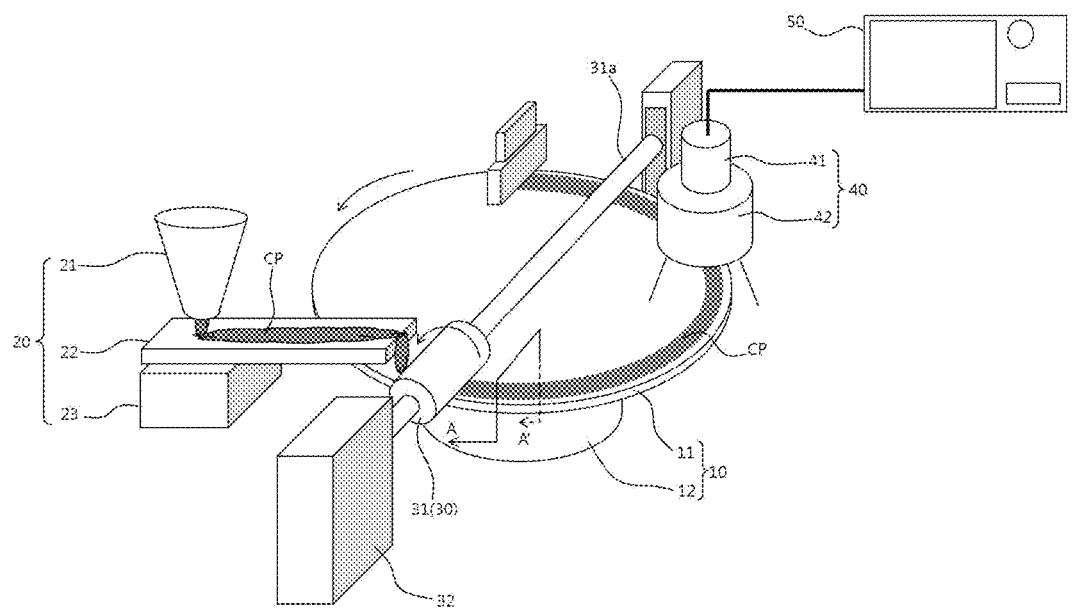
FIG. 1 is a perspective view schematically illustrating a system for analyzing foreign particulate matter in a cathode material powder according to a first embodiment of the present invention.

The objects, specific advantages, and novel features of the present invention will become apparent from the following detailed description and preferred embodiments in conjunction with the accompanying drawings. It should be noted that in the drawings, the same components are denoted by the same reference numerals even though they are depicted in different drawings. Although such terms as "first" and "second," etc. may be used to describe various components, these components should not be limited by above terms. These terms are used only to distinguish one component from another. In the description of the present invention, detailed explanations of related art are omitted when it is deemed that they may unnecessarily obscure the essence of the present invention.

Preferred embodiments of the present invention will now be described in detail with reference to the accompanying drawings.

Figure 2:
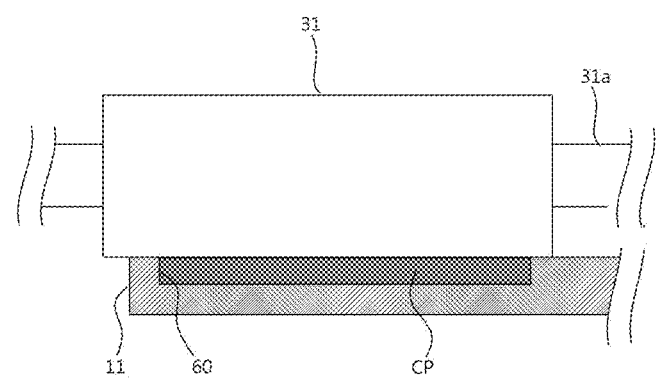
FIG. 2 is a cross-sectional view taken along line A-A' of FIG. 1.
Figure 3:
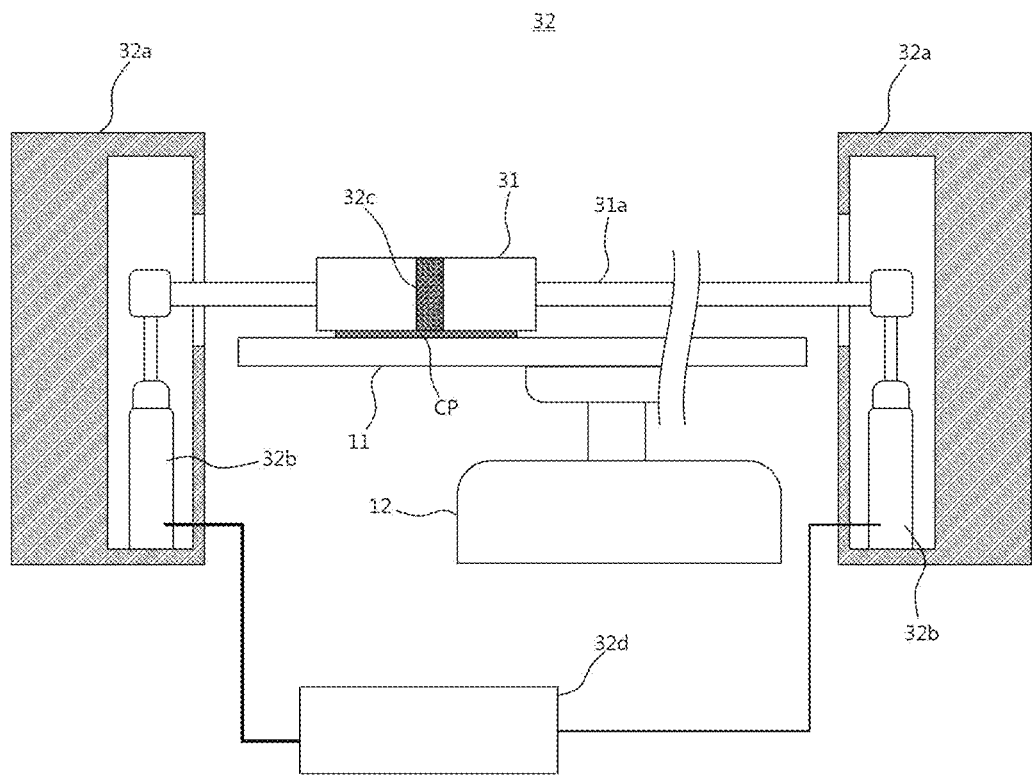
FIG. 3 schematically illustrates the roller unit of FIG. 1.

FIG. 1 is a perspective view schematically illustrating a system for analyzing foreign particulate matter in a cathode material powder according to a first embodiment of the present invention, FIG. 2 is a cross-sectional view taken along line A-A' of FIG. 1, and FIG. 3 schematically illustrates the roller unit of FIG. 1.

As illustrated in FIG. 1, the system includes: a transfer unit 10 including a rotating plate 11 having an upper surface having an edge on which a cathode material powder CP containing foreign particulate matter is placed and a rotary motor 12 rotating the rotating plate 11 and transferring the cathode material powder CP along the circular arc direction as the rotating plate 11 rotates; a supply unit 20 supplying the cathode material powder CP to the upper surface of the rotating plate 11; a roller unit 30 including a main roller 31 pressing the cathode material powder CP supplied from the supply unit 20 to spread the powder in the form of a flat film while a rotary shaft 31a arranged parallel to the upper surface of the rotating plate 11 rotates; an imaging unit 40 imaging the cathode material powder CP spread in the form of a flat film and transferred along the circular arc direction; and an analysis unit 50 analyzing the image captured by the imaging unit 40 to identify the foreign particulate matter.

The present invention is directed to a system for analyzing foreign particulate matter in a cathode material powder. Specifically, the system of the present invention analyzes foreign particulate matter in a cathode material powder as an essential material for a secondary battery. Conventional methods for analyzing foreign particulate matter in a cathode material powder are indirect methods using a small amount of a collected sample. Accordingly, since the conventional methods have difficulty in rapidly analyzing the sample, they are not suitable for real-time production management for mass production. Further, since targets to be analyzed by the conventional methods are limited to magnetic foreign matter, the conventional methods cannot be used to analyze non-magnetic foreign matter. The present invention has been devised to solve these problems.

The system of the present invention includes a transfer unit 10, a supply unit 20, a roller unit 30, an imaging unit 40, and an analysis unit 50, as described above.

The transfer unit 10 includes a rotating plate 11 and a rotary motor 12 to transfer a cathode material powder CP as an analyte. The cathode material powder CP is an essential material for a lithium secondary battery and contains various foreign particulate matter. Typical foreign particulate matter includes metals such as copper (Cu) and iron (Fe). Other examples of foreign particulate matter include non-magnetic foreign matter as well as magnetic foreign matter. The rotating plate 11 is a member that rotates in the circular arc direction about its central axis. The rotating plate 11 transfers the cathode material powder CP containing foreign particulate matter in the circular arc direction. The cathode material powder CP is placed on an edge of an upper surface of the rotating plate 11 and is transferred. The rotating plate 11 is in the shape of a disk in the drawings but is not necessarily limited to this shape. For example, the rotating plate 11 may be formed in various shapes such as a ring shape that have a width sufficient to place the cathode material powder CP thereon. The rotary motor 12 is a driving means that rotates the rotating plate 11.

The supply unit 20 is a means that supplies the cathode material powder CP to the edge of the upper surface of the rotating plate 11. For example, the supply unit 20 may be implemented by a hopper 21 and a chute 22. The hopper 21 stores the cathode material powder CP therein and discharges the cathode material powder CP through a downwardly open outlet. The discharge of the cathode material powder CP or the amount of the cathode material powder CP discharged from the hopper needs to be controlled. To this end, a means may be mounted to open and close the outlet.

The chute 22 provides a passage through which the cathode material powder CP discharged from the hopper 21 is guided to the upper surface of the rotating plate 11. The chute 22 is in the shape of a plate in the drawings but is not particularly limited to this shape as long as the cathode material powder CP can flow thereon. The chute 22 may be inclined at such an angle that the cathode material powder CP flows down toward the rotating plate 11 but is not necessarily inclined. At least one of the hopper 21 and the chute 22 may be vibrated to supply the cathode material powder CP. For this purpose, a supply vibrator 23 is provided to vibrate at least one of the hopper 21 and the chute 22. For simultaneous vibration of the hopper 21 and the chute 22, the hopper 21 and the chute 22 are connected to each other through a connection member and the hopper 21 or the chute 22 is vibrated by the supply vibrator 23. Alternatively, the hopper 21 and the chute 22 may be independently connected to the supply vibrator 23 and vibrated by the supply vibrator 23.

The roller unit 30 is a means that presses the cathode material powder CP supplied from the supply unit 20 to the edge of the upper surface of the rotating plate 11. The roller unit 30 includes a main roller 31. The main roller 31 has a rotary shaft 31a arranged parallel to the upper surface of the rotating plate 11 and is arranged and rotates on the edge of the upper surface of the rotating plate 11. Accordingly, the cathode material powder CP supplied to the edge of the upper surface of the rotating plate 11 rotates with the rotating plate 11 and is introduced and pressed between the main roller 31 and the upper surface of the rotating plate 11. The pressed cathode material powder CP is spread in the form of a flat film and is transferred by rotation of the rotating plate 11. The main roller 31 may rotate by a frictional force generated by rotation of the rotating plate 11 with the cathode material powder CP interposed therebetween. Alternatively, a separate driving means may be provided to rotate the main roller 31. In this case, even when the rotating plate 11 and the main roller 31 rotate in a closer contact with each other, less load is applied to the rotating plate 11. Since the main roller 31 rotates in conjunction with the rotating plate 11, the rotational speed of the main roller 31 can be set taking into consideration that of the rotating plate 11.

The distance between the rotating plate 11 and the main roller 31 needs to be adjusted. To this end, a movement means may be separately provided to move the rotating plate 11 up and down. For example, the movement means may be implemented by a lift and an actuator. As the rotating plate 11 moves up and down, the gap between the rotating plate 11 and the main roller 31 is optimized, enabling effective pressing of the cathode material powder CP.

The cathode material powder CP is pressed by the roller unit 30 to form a flat film having a thickness of 40 to 50 μm. The thickness may be determined by the main roller 31 pressing the cathode material powder CP and a sub-roller 33 secondarily pressing the cathode material powder CP. The sub-roller 33 will be described later.

The imaging unit 40 is a means that images the cathode material powder CP spread in the form of a flat film. Generally, it is difficult to find foreign particulate matter in a deposited cathode material powder CP. However, when a cathode material powder CP is spread in the form of a flat film by the roller unit 30, foreign particulate matter in the cathode material powder CP can be easily detected. In the present invention, the cathode material powder CP spread in the form of a flat film is imaged and the image is analyzed to identify foreign particulate matter. The imaging unit 40 captures an image of the cathode material powder CP in the form of a flat film. To this end, the imaging unit 40 may include a camera 41 and a main light 42. For example, the imaging unit 40 may be implemented by a combination of a ring strobe illumination and a camera 41 but is not necessarily limited thereto.

The analysis unit 50 analyzes the image captured by the imaging unit 40 to identify foreign particulate matter. For example, the analysis unit 50 scans the image to extract RGB values and measures transparency to determine the type and size of foreign particulate matter. The analysis unit 50 for image analysis may be implemented directly by hardware, a software module executed by hardware or a combination thereof. The software module may be located in a random access memory (RAM), a read only memory (ROM), an erasable programmable ROM (EPROM), an electrically erasable programmable ROM (EEPROM), a flash memory, a hard disk, a removable disk, a CD-ROM or any type of computer-readable recording medium well known in the art.

A guide groove 60 may be formed in the rotating plate 11, as illustrated in FIG. 2. The guide groove 60 may be depressed in the form of a ring with a certain width along the edge of the upper surface of the rotating plate 11. Since the edge of the upper surface of the rotating plate 11 formed with the guide groove 60 passes through the main roller 31 while rotating, the guide groove 60 is located to face the main roller 31. The cathode material powder CP supplied by the supply unit 20 is filled in the guide groove 60, pressed by the main roller 31 while the rotating plate 11 rotates, and spread in the form of a flat film.

Referring to FIG. 3, the roller unit 30 may further include a distancing mechanism 32. The distancing mechanism 32 adjusts the distance or closeness between the main roller 31 and the upper surface of the rotating plate 11 to control loads applied to the main roller 31 and the rotating plate 11 and the thickness of a flat film formed by the cathode material powder CP. The distancing mechanism 32 may be implemented by a means that moves the main roller 31 or the rotating plate 11 up and down. The distancing mechanism 32 may be operated manually or automatically. The distance between the main roller 31 and the rotating plate 11 can be adjusted even when the cathode material powder is transferred by the rotating plate 11.

For example, the distancing mechanism 32 may be implemented by a pair of sliding bars 32a, an actuators 32b, a pressure sensor 32c, and a distance controller 32d. The pair of sliding bars 32a are arranged to face each other in the lateral direction with the rotating plate 11 interposed therebetween. With this arrangement, both ends of the rotary shaft 31a of the main roller 31 can be inserted in a one-to-one relationship with the sliding bars. The upward and downward movement of the rotary shaft 31a inserted into the pair of sliding bars 32a is guided along sliding grooves formed in the sliding bars 32a. The actuators 32b are arranged in the pair of sliding bars 32a to move the ends of the rotary shaft 31a up and down. Each of the actuators 32b has a piston and cylinder structure. In this case, the end of the rotary shaft 31a can be coupled to the end of the upwardly and downwardly moving piston. The rotating end of the rotary shaft 31a is inserted into a bearing and the end of the piston can be coupled to the outer surface of the bearing. However, since the structure of the actuators 32b and the coupling relationship of the actuators 32b with the rotation shaft 31a are merely illustrative and the present invention is not limited thereto. The pressure sensor 32c measures a pressure applied to the main roller 31 when the main roller 31 is in close contact with the cathode material powder CP. Based on the pressure information measured by the pressure sensor 32c, the distance controller 32d operates the actuators 32b to move the main roller 31 up and down.

Figure 4:
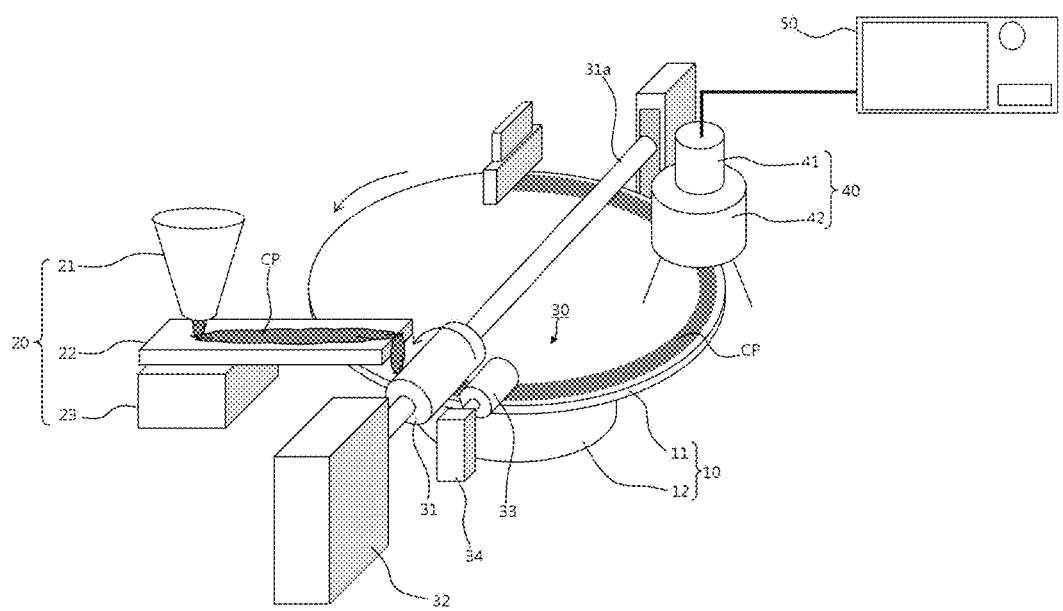
FIG. 4 is a perspective view schematically illustrating a system for analyzing foreign particulate matter in a cathode material powder according to a second embodiment of the present invention.

FIG. 4 is a perspective view schematically illustrating a system for analyzing foreign particulate matter in a cathode material powder according to a second embodiment of the present invention.

As illustrated in FIG. 4, the roller unit 30 of the system may further include a sub-roller 33. The sub-roller 33 is arranged in parallel with the main roller 31 and re-presses the cathode material powder CP spread by the main roller 31 while rotating. Like the main roller 31, the sub-roller 33 is arranged and rotates on the edge of the upper surface of the rotating plate 11. Accordingly, the cathode material powder CP supplied to the edge of the upper surface of the rotating plate 11 rotates with the rotating plate 11, is introduced and primarily pressed between the main roller 31 and the upper surface of the rotating plate 11, is secondarily pressed by the sub-roller 33, and is transferred along the rotational direction of the rotating plate 11. The twice-pressed cathode material powder CP is spread thinner and more evenly so that foreign particulate matter in the cathode material powder CP can be more easily imaged by the imaging unit 40.

The sub-roller 33 may rotate by a frictional force generated by rotation of the rotating plate 11 with the cathode material powder CP interposed therebetween. Alternatively, a separate driving means may be provided to rotate the sub-roller 33. The main roller 31 and the sub-roller 33 may be rotated by individual driving means. In this case, since the sub-roller 33 rotates in conjunction with the main roller 31 and the rotating plate 11, the rotational speed of the sub-roller 33 can be set taking into consideration those of the main roller 31 and the rotating plate 11.

The roller unit 30 may further include a roller vibrator 34. The roller vibrator 34 is a means that vibrates the sub-roller 33 upward and downward. Due to this vibration, the cathode material powder CP is finely compacted and spread while being pressed, achieving its thin and even spreading.

The sub-roller 33 does not have to operate continuously during analysis of the cathode material powder CP and may be spaced apart from the cathode material powder CP on the rotating plate 11 depending on the user's choice. The distance between the sub-roller 33 and the upper surface of the rotating plate 11 can also be adjusted. For example, the distancing mechanism 32 described in the previous embodiment may also be employed in the sub-roller 33.

Figure 5:
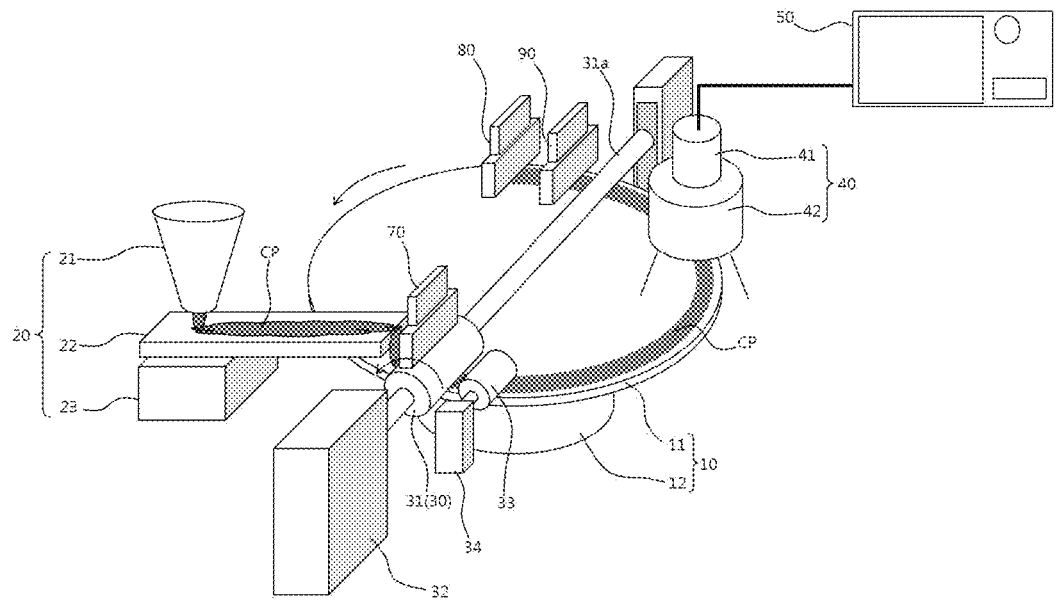
FIG. 5 is a perspective view schematically illustrating a system for analyzing foreign particulate matter in a cathode material powder according to a third embodiment of the present invention.
Figure 6:
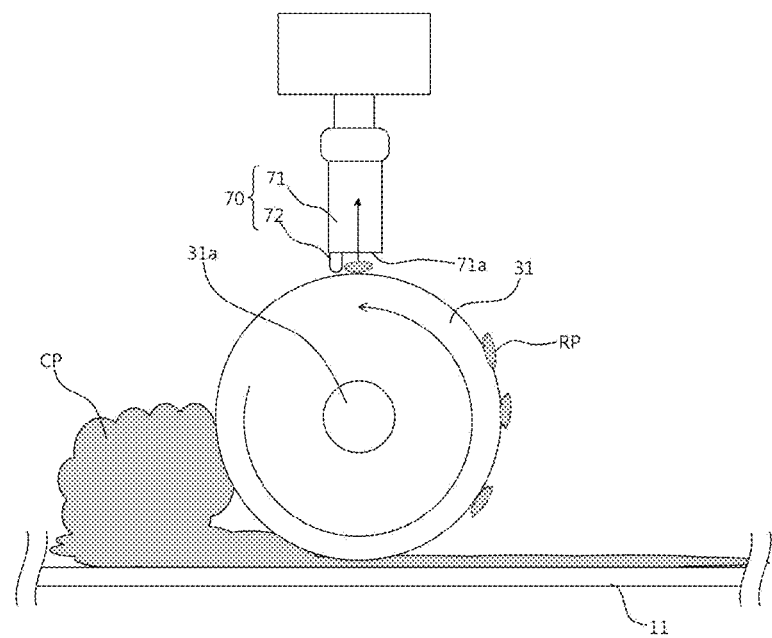
FIG. 6 is a side view schematically illustrating the first suction unit of FIG. 5.
Figure 7:
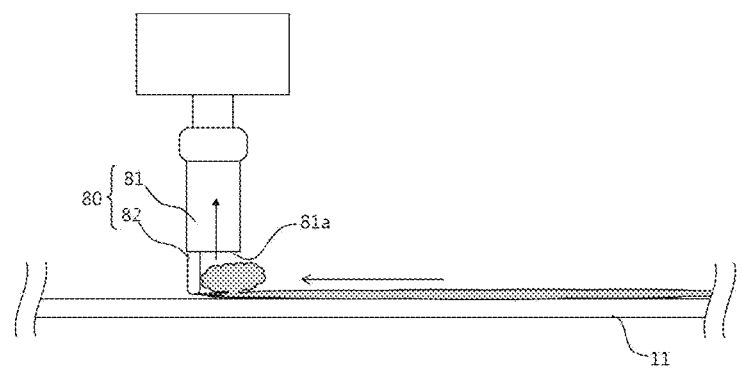
FIG. 7 is a side view schematically illustrating the second suction unit of FIG. 5.

FIG. 5 is a perspective view schematically illustrating a system for analyzing foreign particulate matter in a cathode material powder according to a third embodiment of the present invention, FIG. 6 is a side view schematically illustrating the first suction unit of FIG. 5, and FIG. 7 is a side view schematically illustrating the second suction unit of FIG. 5.

Referring to FIG. 5, the system may further include a first suction unit 70. The first suction unit 70 is a means that sucks the cathode material powder CP pressed by the main roller 31 and attached to the outer surface of the main roller 31. When the main roller 31 presses the cathode material powder CP while rotating, a portion of the cathode material powder CP is attached to the outer surface of the main roller 31. The cathode material powder CP attached to the main roller 31 is not transferred along the rotating plate 11 and is hereinafter referred to as residual powder RP. The residual powder RP on the main roller 31 makes the outer surface of the main roller 31 uneven, and as a result, the cathode material powder CP supplied from the supply unit 20 evenly cannot be evenly pressed. Thus, the first suction unit 70 removes the residual powder RP by suction.

For example, the first suction unit 70 may be implemented by a first suction element 71 and a first scraper 72 (see FIG. 6). The first suction element 71 has a first suction opening 71a facing the upper side of the main roller 31. The residual powder RP on the outer surface of the main roller 31 is sucked through the first suction opening 71a. The first scraper 72 is disposed around the first suction opening 71a and scrapes the residual powder RP while being in contact with the outer surface of the rotating main roller 31. Accordingly, the residual powder RP scraped off by the first scraper 72 is collected around the first suction opening 71a, making its easier removal possible.

The system may further include a second suction unit 80. The second suction unit 80 is a means that sucks and collects the cathode material powder CP imaged by the imaging unit 40.

For example, the second suction unit 80 may be implemented by a second suction element 81 and a second scraper 82 (see FIG. 7). The second suction element 81 has a second suction opening 81a facing the upper surface of the rotating plate 11 at a predetermined point where the cathode material powder CP imaged by the imaging unit 40 is transferred. The cathode material powder CP is sucked through the second suction opening 81a.

The second scraper 82 is disposed around the second suction opening 81a and scrapes the cathode material powder CP while being in contact with the upper surface of the rotating plate 11. Accordingly, the residual powder RP scraped off by the first scraper 72 is collected around the second suction opening 81a, making its easier removal possible. The system may further include a foreign matter suction unit 90. The foreign matter suction unit 90 is a means that sucks the cathode material powder CP containing foreign particulate matter.

When the analysis unit 50 determines that the cathode material powder CP contains foreign particulate matter, the foreign matter suction unit 90 removes the area covering the cathode material powder CP containing the foreign particulate matter by suction. Like the second suction unit 80 of FIG. 7, the foreign matter suction unit 90 may be implemented by a suction element with suction power. When foreign particulate matter is detected after image analysis by the analysis unit 50, the foreign particulate matter is delimited and the time it takes for the foreign particulate matter to reach a suction opening of the foreign matter suction unit 90 is calculated based on the rotational speed of the rotating plate 11 to generate an operation signal. The operation signal can be transmitted to the foreign matter suction unit 90. The foreign matter suction unit 90 can receive the operation signal and remove the delimited cathode material powder by suction.

An upwardly and downwardly movable scraper may be disposed around the suction opening of the foreign matter suction unit 90 to remove the cathode material powder. The scraper moves downward in response to the operation signal and comes into contact with the rotating plate 11. This enables collection of the delimited cathode material powder.

Figure 8:
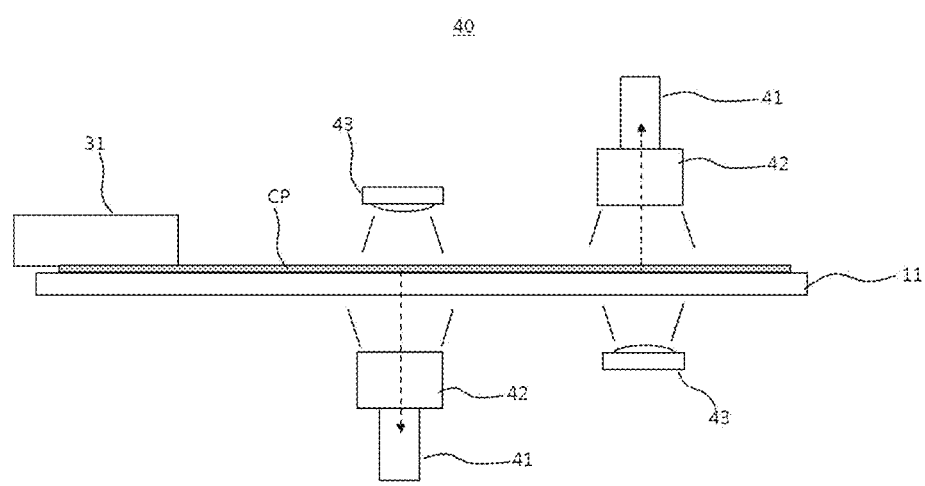
FIG. 8 is a front view schematically illustrating an imaging unit of a system for analyzing foreign particulate matter in a cathode material powder according to a fourth embodiment of the present invention.

FIG. 8 is a front view schematically illustrating an imaging unit of a system for analyzing foreign particulate matter in a cathode material powder according to a fourth embodiment of the present invention.

Referring to FIG. 8, the imaging unit 40 of the system includes a camera 41 and a main light 42 arranged above the upper surface of the rotating plate 11 to image the cathode material powder CP. Another camera 41 and another main light 42 may be arranged below the lower surface of the rotating plate 11. In this case, the cathode material powder CP can be imaged from below. That is, a camera 41 and a main light 42 may be arranged above or below the rotating plate 11 to image one side of the cathode material powder CP. Alternatively, a camera 41 and a main light 42 are arranged above the rotating plate 11 and another camera 41 and another main light 42 are arranged below the rotating plate 11 to image both upper and lower sides of the cathode material powder CP. When both sides of the cathode material powder CP are imaged, the upper and lower surfaces of a flat film formed by the cathode material powder CP can be analyzed simultaneously, enabling analysis of a large amount of the cathode material powder CP with high efficiency. When it intends to image the cathode material powder CP through both upper and lower sides of the rotating plate 11 or the lower side of the rotating plate 11, the rotating plate 11 may be a transparent member.

A sub-light 43 may also be arranged at a position opposite to the camera 41 and the main light 42 through the rotating plate 11.

The camera 41, the main light 42, and/or the sub-light 43 may be provided in plurality on the movement path of the cathode material powder CP. In this case, the cathode material powder CP can be imaged at different points.

Figure 9:
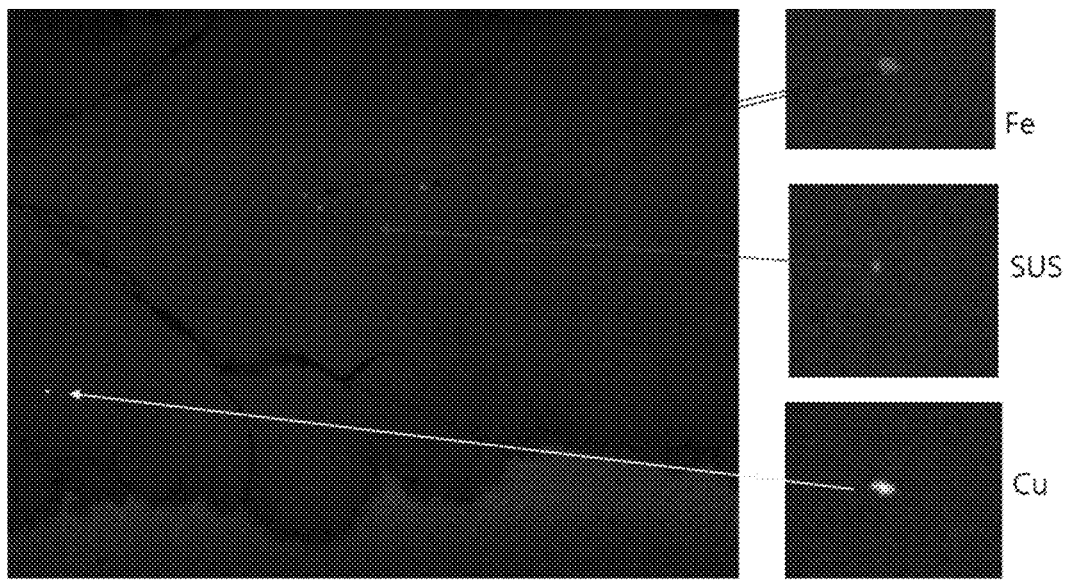
FIG. 9 is an image of a cathode material powder containing foreign particulate matter.
Figure 10:
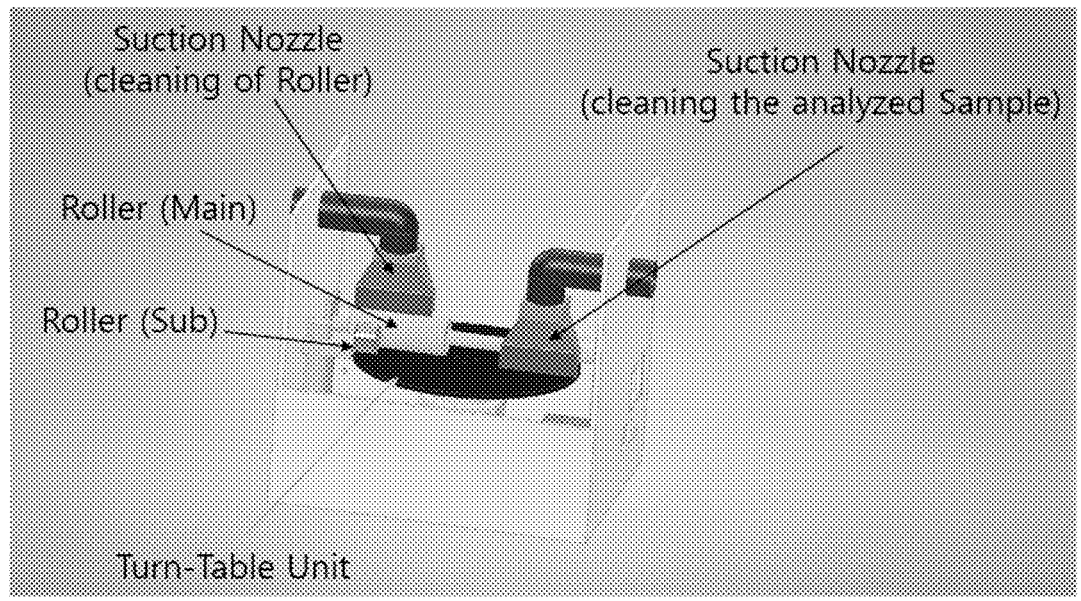
FIG. 10 is a perspective view of a system for analyzing foreign particulate matter in a cathode material powder, which was manufactured for experiments.
Figure 11:
FIG. 11 is an image showing a process for analyzing a cathode material powder using a system for analyzing foreign matter particle systems in the cathode material powder.

FIG. 9 is an image of a cathode material powder containing foreign particulate matter, FIG. 10 is a perspective view of a home-made system for analyzing foreign particulate matter in a cathode material powder, and FIG. 11 is an image showing a process for analyzing a cathode material powder using a home-made system for analyzing foreign matter particle systems in the cathode material powder.

As shown in FIG. 9, the cathode material powder contains various foreign materials. Any of the systems described herein was manufactured to analyze foreign matter. The home-made system was designed such that two rollers are arranged in parallel on a rotating turntable and the cathode material powder on the main roller and the turntable is removed through two suction nozzles (see FIG. 10). The cathode material powder was imaged using a 10-megapixel camera and a light source with a special dark-field light and a high-output LED optical fiber light. Analysis of the foreign particulate matter based on images was done using the CALPAS-PROai program (Scigentec, Korea). As a result, foreign particulate matter in the cathode material powder were effectively analyzed (see FIG. 11).

Although the present invention has been described herein with reference to the foregoing specific embodiments, these embodiments do not serve to limit the invention and are set forth for illustrative purposes. It will be apparent to those skilled in the art that modifications and improvements can be made without departing from the spirit and scope of the invention.

Simple modifications and changes of the present invention belong to the scope of the present invention and the specific scope of the present invention will be clearly defined by the appended claims.

What is claimed is:

1. A system for analyzing foreign particulate matter in a cathode material powder, comprising: a transfer unit comprising a rotating plate having an upper surface having an edge on which a cathode material powder containing foreign particulate matter is placed and a rotary motor rotating the rotating plate and transferring the cathode material powder along the circular arc direction as the rotating plate rotates; a supply unit supplying the cathode material powder to the upper surface of the rotating plate; a roller unit comprising a main roller pressing the cathode material powder supplied from the supply unit to spread the powder in the form of a flat film while a rotary shaft arranged parallel to the upper surface of the rotating plate rotates; an imaging unit imaging the cathode material powder spread in the form of a flat film and transferred along the circular arc direction; and an analysis unit analyzing the image captured by the imaging unit to identify the foreign particulate matter.

2. The system according to claim 1, further comprising a guide groove which is depressed in the form of a ring along the edge of the upper surface of the rotating plate so as to face the main roller, in which the cathode material powder is filled, and through which the filled cathode material powder is spread in the form of a flat film.

3. The system according to claim 1, wherein the supply unit comprises a hopper storing the cathode material powder therein and a chute supplying the cathode material powder discharged from the hopper to the upper surface of the rotating plate.

4. The system according to claim 3, wherein the supply unit further comprises a supply vibrator vibrating at least one of the hopper and the chute.

5. The system according to claim 1, wherein the roller unit further comprises a distancing mechanism adjusting the distance between the main roller and the upper surface of the rotating plate.

6. The system according to claim 5, wherein the distancing mechanism comprises: a pair of sliding bars arranged to face each other such that both ends of the rotary shaft of the main roller are inserted and guiding upward and downward movement of the rotary shaft; actuators arranged in the corresponding sliding bars and moving the ends of the rotary shaft up and down; a pressure sensor measuring a pressure applied to the main roller when the main roller is in close contact with the cathode material powder; and a distance controller operating the actuators based on the pressure information measured by the pressure sensor.

7. The system according to claim 1, wherein the roller unit further comprises a sub-roller arranged in parallel with the main roller and pressing the cathode material powder spread by the main roller while rotating to re-spread the cathode material powder.

8. The system according to claim 7, wherein the roller unit further comprises a roller vibrator vibrating the sub-roller in upward and downward directions.

9. The system according to claim 1, further comprising a first suction unit sucking residual powder pressed by the main roller and attached to the outer surface of the main roller.

10. The system according to claim 9, wherein the first suction unit comprises: a first suction element having a first suction opening facing the upper side of the main roller; and a first scraper disposed around the first suction opening and scraping the residual powder while being in contact with the outer surface of the rotating main roller.

11. The system according to claim 1, further comprising a second suction unit sucking the cathode material powder imaged by the imaging unit.

12. The system according to claim 11, wherein the second suction unit comprises: a second suction element having a second suction opening facing the upper surface of the rotating plate at a point where the cathode material powder is imaged by the imaging unit and transferred; and a second scraper disposed around the second suction opening and scraping the cathode material powder while being in contact with the outer surface of the rotating plate.

13. The system according to claim 1, wherein when the analysis unit determines that the cathode material powder contains foreign particulate matter, the system further comprises a foreign matter suction unit sucking the cathode material powder containing the foreign particulate matter.

* * * * *